Figure 1:
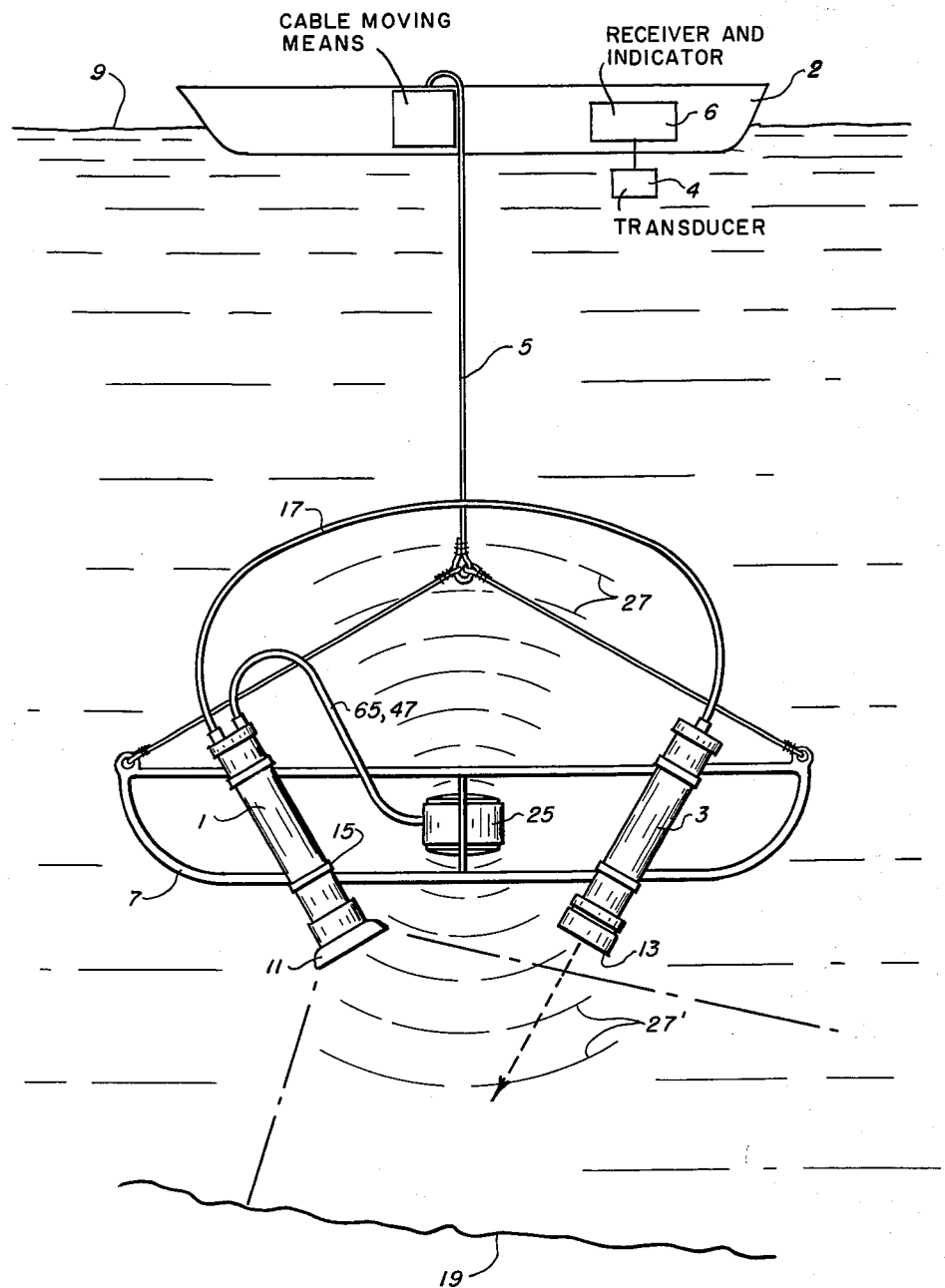

Jan. 21, 1964 H. E. EDGERTON 3,119,092
DISTANCE-MEASURING METHOD AND APPARATUS
Filed June 4, 1956 2 Sheets-Sheet 1

Inventor
Harold E. Edgerton
by Rines and Rines
Attorneys

Jan. 21, 1964     H. E. EDGERTON     3,119,092
DISTANCE-MEASURING METHOD AND APPARATUS

Filed June 4, 1956     2 Sheets-Sheet 2

Inventor
Harold E. Edgerton
by Rines and Rines
Attorneys 3,119,092
DISTANCE-MEASURING METHOD AND
APPARATUS
Harold E. Edgerton, Belmont, Mass., assignor to Edgerton, Germeshausen & Grier, Inc., Boston, Mass., a corporation of Massachusetts
Filed June 4, 1956, Ser. No. 589,079
24 Claims. (Cl. 340—3)

The present invention relates to distance-measuring methods and apparatus and, more particularly, to acoustic-energy systems for determining the distance of underwater objects from underwater surfaces.

It is frequently desirable continuously to measure the distance of an object from a reference location or surface under circumstances where neither the object nor the reference location or surface are visible or accessible to the point where this information is required. As an illustration, it may be desirable to measure from a vessel upon the surface of the ocean or other body of water, the distance between certain underwater objects and the bottom of the ocean or other body of water. In my copending application, Serial No. 437,647, filed June 18, 1954, for Underwater Flash-Producing System, now Patent No. 2,872,622, flash-photography apparatus is described which may be lowered into the ocean or other body of water to photograph objects at considerable depths. It is very important that, during the lowering of this expensive equipment or during the towing of the same, the equipment does not collide with the ocean bottom or with ledges or other irregularities therealong. Some of the uses of such equipment is described, for example, in the National Geographic Magazine, April 1955, in my article commencing with page 523, entitled "Photographing the Sea's Dark Underworld." In the underwater studies therein described, a sound transmitter sent pulses to the vessel on the surface so long as a feeler probe, extending below the equipment, remained free of the ocean bottom. When the feeler proble struck the bottom, it would render the sound transmitter inoperative so that the operators on the vessel would detect, through the absence of further sound impulses, that the equipment had been lowered to the desired distance from the ocean bottom. Further details relating to apparatus of this character are contained in my copending application, Serial No. 513,377, filed June 6, 1955, for Surface-Indicating Apparatus, now Patent No. 2,975,397.

While this probe-type of bottom indicator has proved successful, there are occasions where the use of the probes does not give all the information that may be desired. Once the probe has reached the bottom, for example, there is no way of indicating variations in position of the equipment from the bottom until the ocean bottom drops to a point sufficient that the probe no longer contacts the same. It has been found very desirable in some studies, however, to determine continuously the actual distance of the equipment from the bottom. This can sometimes be determined by sonar-type ranging equipment on the vessel. In view of the small size of the flash or other apparatus being lowered underwater and the considerable divergence of the acoustic energy transmitted from the vessel into the water, such ranging equipment leaves much to be desired in providing reliable continuous distance measurements. There have been proposals, however, to control the depth of underwater objects from the ocean bottom by transmitting such sonar signals from a vessel on the surface downward toward the underwater object in the ocean bottom, positioning the underwater object in the path of the downwardly projecting signals, and recording the time of arrival of the signals at the object itself and, also, the time of arrival of the signals that have been reflected from the ocean bottom and have returned to the object. The time interval between the arrival of these signals provides information from which the distance between the object and the ocean bottom may be calculated. Such a technique, however, is again subject to the limitations of transmissions from the vessel on the surface, and, in addition, requires that measurements and calculations be effected at the object itself. Such restrictions render these proposals unsuited for the particular purposes of the present invention such as the flash-photography explorations above discussed.

An object of the present invention, therefore, is to provide a new and improved method of and apparatus for determining the distance of submerged objects from a predetermined surface, such as the ocean bottom, that shall not be subject to the previously mentioned disadvantages. In summary, this result is attained through transmitting energy from the object itself simultaneously toward the surface vessel and toward the reflecting ocean bottom or other surface.

A further object is to provide a distance-measuring apparatus and method of more general utility with any kind of energy transmissions, such as electromagnetic transmissions, though for purposes of illustration, the invention is hereinafter described in connection with the preferred application to acoustic energy in underwater media.

An additional object is to provide a novel flash-producing and distance-measuring apparatus.

Other and further objects will be explained hereinafter and will be more particularly pointed out in the appended claims.

Figure 2:
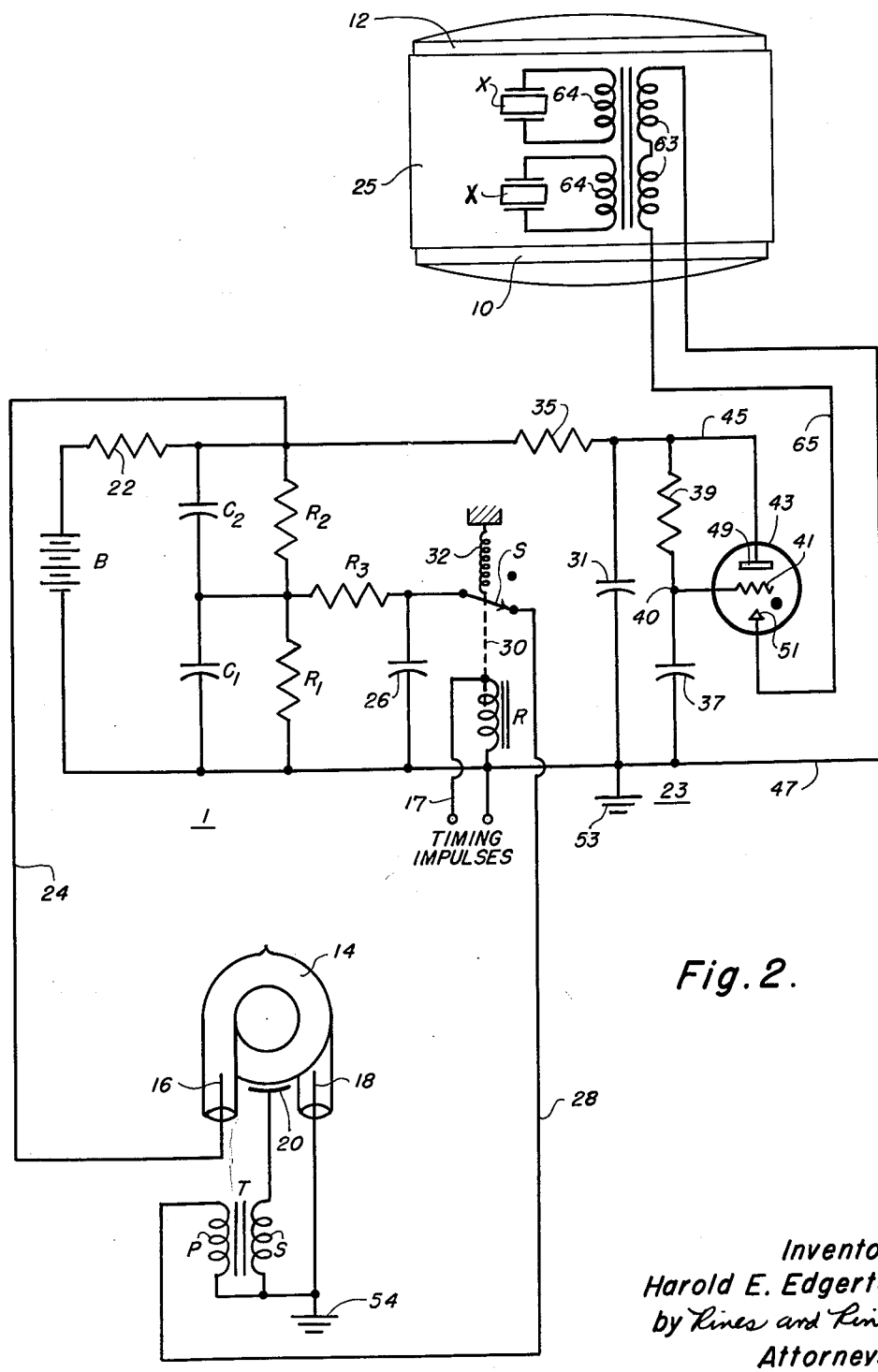

The invention will now be described in connection with accompanying drawing FIG. 1 of which is a side elevation illustrating the invention as applied to underwater measurements; and FIG. 2 is a schematic circuit diagram of a preferred electrical circuit for use in the system of FIG. 1.

While the invention will now be described in connection with its preferred application to underwater photographic equipment, it is to be understood that this is by way of illustration and that, as before stated, the invention may be utilized in other applications to indicate or measure the distance between a surface or object and another object. In FIG. 1, therefore, a light-flash-producing apparatus 1 and a camera 3, strapped or otherwise secured, as at 15, to the legs of a support 7, are shown being lowered by a cable 5 below the surface 9 of the water from a ship or other vessel 2. The flash-producing apparatus 1 and the camera 3 may be of any desired type, properly water-proofed and adapted to withstand underwater pressures. As an example, they may be of the type described in the said co-pending application Serial No. 437,647 and in the said National Geographic article, embodying a sealed light reflector 11 at the lower end of the tubular housing 1 containing the flash-producing apparatus, and a sealed camera window 13 disposed at the bottom of the tubular camera housing 3. The camera 3, as discussed in the said application Serial No. 437,647 and in the said article, may be adapted to expose successive portions of a continuous film through synchronization, provided by means of the electric cable 17, with the production of timed light flashes from the flash-producing apparatus 1.

It is essential for many uses of such flash-photography apparatus, as well as for the use of other underwater equipment, as before mentioned, to have a mechanism for informing the ship or vessel 2 at the remote location above the surface 9 of the water, when the apparatus 1, 3 has been lowered to the bottom 19 or to a predetermined distance from the bottom surface 19, and to indicate continuously the distance from the bottom surface 19. This indication must be accurate, substantially instantaneous, automatic and independent of water currents and other disturbances. It must be effected not only to safeguard against the apparatus striking or dragging along the bottom, but to provide accurate information from moment to moment of the position of the apparatus.

In accordance with the present invention, this information is provided by acoustic-vibration impulse signals generated by an acoustic transducer 25 supported near the bottom of the support 7. The sound transducer 25 preferably comprises, within its water-tight casing, piezo-electric crystals, later discussed, adapted to transmit acoustic energy both in a direct direction upward to the remote vessel 2, indicated by the wave fronts 27, and simultaneously in the opposite downward direction toward the bottom surface 19, indicated by the wave fronts 27'. Since the acoustic energy emanates from the submerged apparatus itself and not from the remote vessel 2, there is little divergence of the wave fronts 27' so that strong reflections may be obtained not only from the surface 19 of the ocean bottom but from hidden surfaces or objects therebelow, as well. This greatly aids in underwater exploration. The signal transmitted upward along the wave fronts 27, moreover, is a direct signal. It will be received in a transducer 4 and indicated, as, for example, upon a sonar-type recording drum or oscillograph 6. The wavefronts 27' will, meantime, have reflected and scattered from the bottom surface 19 and will be directed, also, to the vessel 2, being received at a time later than the time of reception of the direct signal 27. This time difference in reception of the direct signal 27 and the signal 27' after reflection from the surface 19 will be a measure of the distance between the apparatus 25 and the bottom surface 19.

A preferred electrical pulse-producing or generator apparatus 23 is shown in FIG. 2 comprising a relaxation oscillator employing a source of direct-current, such as a bleeder network $R_1$, $R_2$, for charging a main condenser 31 through a charging impedance, such as a resistor 35. The apparatus 23 may be disposed within the flash-producing housing 1 together with the hereinafter described flash-producing circuits. A second condenser 37 also charges at the same time through the impedance 35 and a further impedance, such as a resistor 39. The junction 40 between the second condenser 37 and the resistor 39 is connected to the control or trigger grid electrode 41 of a gaseous-discharge tube 43, such as a thyratron or the like. The upper electrode of the condenser 31 is connected by a conductor 45 to the anode 49 of the tube 43. The lower electrode of the condenser 31 is preferably connected to a reference point, such as the chassis of the equipment, indicated by the ground connection 53, and by a conductor 47 to the upper end of a transformer primary winding 63 of the transducer 25. The lower end of the winding 63 is connected by a conductor 65 to the cathode 51 of the gaseous-discharge tube 43. The conductors 47 and 65 are enclosed in water-tight insulation or other coverings. Cooperative with the winding 63 of the transducer 25 may be a plurality of secondary windings 64 which, in turn, drive one or more piezoelectric crystals X. Magnetostrictive, magnetomotive and other vibratory elements may also be used. The crystals X will be vibrated by the energization of the winding 63 to produce sound energy, as is well known. The elements X may be associated with a metal diaphragm, not shown, it being understood that any other conventional underwater transducer may similarly be employed.

In operation, when the second condenser 37 has charged to a voltage sufficient to trigger the tube 43 between the control grid electrode 41 and the cathode 51, the charged condenser 31 will discharge through the tube 43 between the anode 49 and the cathode 51. The discharge circuit may be traced from the upper electrode of the condenser 31 by way of conductor 45 to the anode 49, through the tube 43 and to the cathode 51, through the conductor 65 and the winding 63 and through conductor 47 to the lower electrode of the condenser 31. The winding 63 becomes thus energized to vibrate the acoustic-energy-producing elements X and thus to produce sound-wave-vibration signal impulses 27 and 27', directed upward and downward, respectively. When the condenser 31 has thus discharged through the winding 63 and the tube 43, the tube 43 stops conducting and the winding 63 becomes de-energized, terminating the acoustic-wave vibration signal. The process of re-charging the condensers 31 and 37 then recommences until a further energization of the winding 63 takes place upon the next-following condenser discharges. Successive signal impulses of acoustic energy are thus transmitted automatically upward and downward while the apparatus 1, 3, 7, 25 is being lowered into the water, the recurrence frequency of the signals being adjustable by adjusting the time constants of the charging circuits before described, such as by varying the value of the impedances 35 and 39.

Since it is desirable that the signals received in the remote vessel 2 be of comparable magnitude, and since, also, a greater intensity of signal is required to travel the reflected path of the wavefronts 27' from the transducer 25 downward to the reflecting surface 19 and thence upward to the receiving transducer 4, the intensity or magnitude of the transmitted signal 27' is preferably greater than that of the transmitted signal 27. This result may be effected, for example, by filling the transducer housing 25 with oil and using a thin rubber bottom face 10 which passes the acoustic energy freely and an absorbing upper face 12, as of cork. The same result can, of course, be obtained in other ways, also.

In accordance with the present invention, furthermore, the vessel 2 is appraised of the fact that the flash-producing apparatus 1 is or is not working. A gaseous-discharge flash-lamp 14 having principal electrodes 16 and 18 and a trigger electrode 20 may constitute the flash-illumination source within the reflector 11 of FIG. 1. Main flash capacitors or condensers $C_1$ and $C_2$ may be charged through a limiting impedance 22 from a source B which may, in actual practice, comprise a voltage-doubler circuit operating from a vibrator power-supply that is, in turn, energized from dry batteries. The voltage stored in the flash capacitors $C_1$, $C_2$ is applied by conductor 24 and the ground terminals 53 and 54 between the electrodes 16 and 18 of the flashtube 14. A further capacitor or condenser 26 may be charged from the intermediate tap of the bleeder network $R_1$, $R_2$, through a resistor $R_3$ so that, upon closure of a switch S, as illustrated, the capacitor 26 will discharge by way of conductor 28, the primary winding P of a trigger transformer T and the ground connections 54 and 53, to produce a trigger impulse in the secondary winding S that is applied to the trigger electrode 20. A discharge of the voltage stored in the capacitors $C_1$ and $C_2$ is thus initiated through the gaseous medium of the flashtube 14, between the electrodes 16 and 18 thereof, producing a flash of light. As explained in the said copending application, Serial No. 437,647 and in the said article, the control of the triggering of the flashtube 14 by the operation of the switch S may be effected synchronously with the advancing of film in the camera 3, by a motor-driven timing mechanism that provides timing impulses for energizing a relay, such as the relay R. When energized, the switch S is drawn downward by the armature 30, shown dotted, in opposition to the action of the biasing spring 32, triggering a flash.

The rate of flashing is, however, less than the rate of acoustic-signal impulses produced by the relaxation oscillator 43. When, therefore, a flash occurs in the circuit 1, since the flash capacitors $C_1$, $C_2$ have lost their stored voltage in producing the flash, there is no such voltage for operating the oscillator 43. The transducer 25, therefore, is not pulsed until the flash capacitors $C_1$, $C_2$ recharge to a sufficient voltage level. At the vessel 2, therefore, the train of acoustic pulses arriving at the transducer 4 will be periodically interrupted by the loss of one or more pulses, indicating the proper flashing operation of the flash-producing circuit 1.

Other types of energy transmitters may, of course, be utilized in connection with the present invention, as before stated, and further modifications will occur to those skilled in the art. All such are considered to fall within the scope of the invention as defined in the appended claims.

What is claimed is:

1. Distance-measuring apparatus having, in combination, transmitting means, means for moving the transmitting means continually toward a predetermined surface, the transmitting means comprising means for simultaneously transmitting energy of predetermined magnitude along a first direction to a remote reception point and energy of greater magnitude along the substantially opposite direction to the predetermined surface, means disposed at the remote reception point for receiving the energy transmitted along the first direction thereto and the energy transmitted along the substantially opposite direction and reflected from the predetermined surface to the reception point, and means for determining from said received energy the distance between said transmitting means and said surface.

2. Distance-measuring apparatus having, in combination, transmitting means, means for moving the transmitting means continually toward a predetermined surface, the transmitting means comprising means for simultaneously transmitting acoustic energy of predetermined magnitude along a first direction to a remote reception point and energy of greater magnitude along the substantially opposite direction to the predetermined surface, means disposed at the remote reception point for receiving the acoustic energy transmitted along the first direction thereto and the acoustic energy transmitted along the substantially opposite direction and reflected from the predetermined surface to the reception point, and means for determining from said received energy the distance between said transmitting means and said surface.

3. Distance-measuring apparatus having, in combination, acoustic-vibration signal-transmitting means comprising an electric oscillator and acoustic-vibration transducer means connected to be energized by the electric oscillations of the oscillator to produce an acoustic-vibration signal, the transducer means being positioned to transmit acoustic-vibration signals in substantially opposite directions with less intensity in one direction than in the other; means for moving the transmitting means continually away from a predetermined point remote from the transmitting means and toward a predetermined surface; means disposed at the remote predetermined point for receiving the signals transmitted along the said one direction directly to the predetermined point, and along the substantially opposite direction and reflected from the said surface to the predetermined point, and means for determining from said received signals the distance between said transmitting means and said surface.

4. Distance-measuring apparatus having, in combination, acoustic-vibration signal-transmitting means comprising an electric relaxation oscillator embodying a gaseous-discharge device and acoustic-vibration transducer means connected to be energized by the electric relaxation oscillations of the oscillator to produce an acoustic-vibration signal, the transducer means being positioned to transmit acoustic-vibration signals in substantially opposite directions; means for moving the transmitting means continually away from a predetermined point remote from the transmitting means and toward a predetermined surface; means disposed at the remote predetermined point for receiving the signals transmitted along one direction directly to the predetermined point, and along the substantially opposite direction and reflected from the said surface to the predetermined point, and means for determining from said received signals the distance between said transmitting means and said surface.

5. Apparatus of the character described having, in combination, an electric flash-producing system adapted to be moved away from a predetermined point toward a predetermined surface, transmitting means connected as a unit with the flash-producing system for enabling a determination of the distance of the flash-producing system from the said surface, means for moving toward the said surface the said unit of the transmitting means and the flash-producing system, the transmitting means comprising means for simultaneously transmitting energy directly toward the predetermined point and toward the predetermined surface, and means disposed at the predetermined point for receiving the energy directly transmitted thereto and the energy transmitted toward the predetermined surface and reflected therefrom to the predetermined point in order to determine the distance between the flash-producing system and the predetermined surface.

6. Apparatus of the character described having, in combination, an electric flash-producing system adapted to be moved away from a predetermined point toward a predetermined surface, transmitting means connected as a unit with the flash-producing system for enabling a determination of the distance of the flash-producing system from the said surface, means for moving toward the said surface the said unit of the transmitting means and the flash-producing system, the transmitting means comprising means for simultaneously transmitting acoustic energy directly toward the predetermined point and toward the predetermined surface, and means disposed at the predetermined point for receiving the acoustic energy directly transmitted thereto and the acoustic energy transmitted toward the predetermined surface and reflected therefrom to the predetermined point in order to determine the distance between the flash-producing system and the predetermined surface.

7. Apparatus of the character described having, in combination, an electric flash-producing system comprising voltage-storing means, an electric flash device connected to the voltage-storing means, and a trigger device for initiating the discharge of the stored voltage through the flash device to produce a flash; means for moving the flash-producing system away from a predetermined point toward a predetermined surface; and transmitting means connected as a unit and movable with the flash-producing system for enabling a determination of the distance of the flash-producing system from the said surface during movement toward the said surface as a unit with the flash-producing system, the transmitting means comprising means for simultaneously transmitting energy directly toward the predetermined point and toward the predetermined surface, the transmitting means being energized from the said voltage-storing means in order that, during the discharge of the stored voltage to produce a flash, the transmitting means loses its energizing voltage and is momentarily ineffective, thus indicating to the predetermined point that a flash has occurred.

8. Apparatus of the character described having, in combination, an electric flash-producing system comprising voltage-storing means, an electric flash device connected to the voltage-storing means, and a trigger device for initiating the discharge of the stored voltage through the flash device to produce a flash; means for moving the flash-producing system away from a predetermined point toward a predetermined surface; and transmitting means connected as a unit and movable with the flash-producing system for enabling a determination of the distance of the flash producing system from the said surface during movement toward the said surface as a unit with the flash-producing system, the transmitting means comprising means for simultaneously transmitting energy directly toward the predetermined point and toward the predetermined surface, the transmitting means being energized from the said voltage-storing means in order that, during the discharge of the stored voltage to produce a flash, the transmitting means loses its energizing voltage and is momentarily ineffective, thus indicating to the predetermined point that a flash has occurred; and means disposed at the predetermined point for receiving the energy directly transmitted thereto and the energy transmitted toward the predetermined surface and reflected therefrom to the predetermined point.

9. Apparatus of the character described having, in combination, an electric flash-producing system comprising voltage-storing means, an electric flash device connected to the voltage-storing means, and a trigger device for periodically initiating the discharge of the stored voltage through the flash device periodically to produce a flash; means for moving the flash-producing system away from a predetermined point toward a predetermined surface; acoustic-vibration signal-transmitting means comprising an electric impulse generator energized from the said voltage-storing means and acoustic-vibration transducer means connected to be energized by the generator to produce periodic acoustic-vibration signal impulses at a rate greater than the rate of production of the periodic flashes, means for connecting the transmitting means as a unit movable with the flash-producing system, means for moving toward the said surface the said unit of the transmitting means with the flash-producing system, the transmitting means being adapted to transmit acoustic-vibration signal impulses directly toward the predetermined point and toward the predetermined surface; and means disposed at the predetermined point for receiving the signal directly transmitted thereto and the signal transmitted toward the predetermined surface and reflected therefrom to the predetermined point, thereby determining the distance between the transmitting means and the said predetermined surface, the periodic loss of stored voltage during the production of the flashes resulting in periodic loss of acoustic-vibration signals, thus indicating to the predetermined point that flashes have occurred.

10. Apparatus of the character described having, in combination, a voltage operated electric system that may occupy different physical positions and provided with voltage-storing means for operating the same by utilization of the stored voltage, energy-transmitting means connected with the electric system and movable therewith to the said positions for transmitting energy signals indicative of the position of the electric system, the energy-transmitting means being connected to operate from the said voltage-storing means in order that, upon operation of the electric system through utilization of the stored voltage, the energy-transmitting means is rendered inoperative, thereby to indicate that the electric system has operated.

11. A method of the character described that comprises directing energy transmited by a transmitter simultaneously along a first direction to a remote point and along a second direction toward a predetermined energy-reflective surface, moving the transmitter away from the remote point toward the predetermined surface during the transmission of said energy, receiving at the remote point the energy transmitted along the second direction and reflected from the said surface to the remote point, determining from said received energy the distance between the transmitter and the said surface, and controlling the moving in accordance with the determined distance.

12. A method of the character described that comprises directing energy transmitted by a transmitter simultaneously along a first direction to a remote point and along a second direction toward a predetermined energy-reflective surface, moving the transmitter away from the remote point toward the predetermined surface during the transmission of said energy, receiving at the remote point the energy transmitted thereto along the first direction and the energy transmitted along the second direction and reflected from the said surface to the remote point, determining from said received energy the distance between the transmitter and the said surface, and limiting the moving to insure positioning of the transmitter a predetermined distance from the said surface.

13. Apparatus of the character described having, in combination, a light-flash-producing system that may occupy different physical positions and provided with voltage-storing means for flashing the same by utilization of the stored voltage, energy-transmitting means connected with the flash-producing system to occupy the said positions therewith for transmitting energy signals indicative of the position of the flash-producing system, the energy-transmitting means being connected to operate from the said voltage-storing means in order that, upon flashing of the flash-producing system through utilization of the stored voltage, the energy-transmitting means is rendered at least momentarily inoperative, thereby to indicate that the flash-producing system has flashed.

14. Apparatus of the character described having, in combination, a light-flash-producing system adapted to be moved away from a predetermined point toward a predetermined surface, transmitting means connected as a unit with the flash-producing system for enabling a determination of the distance of the flash-producing system from the said surface, means for moving toward the said surface the said unit of the transmitting means and the flash-producing system, the transmitting means comprising means for simultaneously transmitting energy directly toward the predetermined point and toward the predetermined surface, and means disposed at the predetermined point for receiving the energy directly transmitted thereto and the energy transmitted toward the predetermined surface and reflected therefrom to the predetermined point in order to determine the distance between the flash-producing system and the predetermined surface.

15. Apparatus of the character described having, in combination, a light-flash-producing system adapted to be moved away from a predetermined point toward a predetermined surface transmitting means connected as a unit with the flash-producing system for enabling a determination of the distance of the flash-producing system from the said surface, means for moving toward the said surface the said unit of the transmitting means and the flash-producing system, the transmitting means comprising means for simultaneously transmitting acoustic energy directly toward the predetermined point and toward the predetermined surface, and means disposed at the predetermined point for receiving the acoustic energy directly transmitted thereto and the acoustic energy transmitted toward the predetermined surface and reflected therefrom to the predetermined point.

16. Apparatus of the character described having, in combination, a light-flash-producing system comprising voltage-storing means, a light flash device connected to the voltage-storing means, and a trigger device for initiating the discharge of the stored voltage through the flash device to produce a flash; means for moving the flash-producing system away from a predetermined point toward a predetermined surface; and transmitting means connected as a unit and movable with the flash-producing system for enabling a determination of the distance of the flash-producing system from the said surface during movement toward the said surface as a unit with the flash-producing system, the transmitting means comprising means for simultaneously transmitting energy directly toward the predetermined point and toward the predetermined surface, the transmitting means being energized from the said voltage-storing means in order that, during the discharge of the stored voltage to produce a flash, the transmitting means loses its energizing voltage and is momentarily ineffective, thus indicating to the predetermined point that a flash has occurred.

17. Apparatus of the character described having, in combination, a light-flash-producing system comprising voltage-storing means, a light-flash device connected to the voltage-storing means, and a trigger device for initiating the discharge of the stored voltage through the flash device to produce a flash; means for moving the flash-producing system away from a predetermined point toward a predetermined surface; and transmitting means connected as a unit and movable with the flash-producing system for enabling a determination of the distance of the flash producing system from the said surface during movement toward the said surface as a unit with the flash-producing system, the transmitting means comprising means for simultaneously transmitting energy directly toward the predetermined point and toward the predetermined surface, the transmitting means being energized from the said voltage-storing means in order that, during the discharge of the stored voltage to produce a flash, the transmitting means loses its energizing voltage and is momentarily ineffective, thus indicating to the predetermined point that a flash has occurred; and means disposed at the predetermined point for receiving the energy directly transmitted thereto and the energy transmitted toward the predetermined surface and reflected therefrom to the predetermined point.

18. Apparatus of the character described having, in combination, a light-flash-producing system comprising voltage-storing means, a light-flash device connected to the voltage-storing means and a trigger device for periodically initiating the discharge of the stored voltage through the flash device periodically to produce a flash; means for moving the flash-producing system away from a predetermined point toward a predetermined surface; acoustic-vibration signal-transmitting means comprising an electric impulse generator energized from the said voltage-storing means and acoustic-vibration transducer means connected to be energized by the generator to produce periodic acoustic-vibration signal impulses at a rate greater than the rate of production of the periodic flashes, means for connecting the transmitting means as a unit movable with the flash-producing system, means for moving toward the said surface the said unit of the transmitting means with the flash-producing system, the transmitting means being adapted to transmit acoustic-vibration signal impulses directly toward the predetermined point and toward the predetermined surface; and means disposed at the predetermined point for receiving the signal directly transmitted thereto and the signal transmitted toward the predetermined surface and reflected therefrom to the predetermined point, thereby determining the distance between the transmitting means and the said predetermined surface, the periodic loss of stored voltage during the production of the flashes resulting in periodic loss of acoustic-vibration signals, thus indicating to the predetermined point that flashes have occurred.

19. A method of the character described that comprises directing energy transmitted by a transmitter simultaneously along a first direction to a remote point and along a second, substantially opposite direction toward a predetermined energy-reflective surface, moving said transmitter away from said remote point toward said surface during the transmission of said energy and maintaining said transmitter between said remote point and said predetermined surface, receiving at the remote point the energy transmitted thereto along the first direction and the energy transmitted along the second direction and reflected from the said surface to the remote point, and determining from said received energy the distance between the transmitter and the said surface.

20. The method of claim 19 in which acoustic energy is transmitted by said transmitter.

21. A method of the character described that comprises lowering a transmitter into a body of water toward the bottom of said body, transmitting energy from said transmitter simultaneously up toward a remote point and down toward said bottom during the lowering of said transmitter, receiving at said remote point the energy transmitted directly from said transmitter and the energy reflected from said bottom to said remote point, and determining from said received energy the distance between said transmitter and said bottom.

22. The method of claim 21 in which acoustic energy is transmitted by said transmitter.

23. Distance-measuring apparatus having, in combination, transmitting means adapted to be moved toward a predetermined surface and comprising means for simultaneously transmitting energy along a first direction to a remote reception point and along substantially the opposite direction to the predetermined surface, means for moving said transmitting means continually toward said surface during the transmission of said energy means adjacent said remote point for positioning said transmitter between said point and said surface, means disposed at the remote reception point for receiving the energy transmitted along said first direction thereto and the energy transmitted along said substantially opposite direction and reflected from the predetermined surface to the reception point, and means for determining from said received energy the distance between said transmitting means and said surface.

24. The apparatus of claim 23 in which said transmitting means comprises an electric oscillator and acoustic-vibration transducer means connected to be energized by the electric oscillations of the oscillator to produce an acoustic-vibration signal.

References Cited in the file of this patent

UNITED STATES PATENTS

| | | |
|---|---|---|
| 602,422 | Batcheller | Apr. 19, 1898 |
| 1,562,485 | Affel | Nov. 24, 1925 |
| 2,047,974 | Lehr | July 21, 1936 |
| 2,156,519 | Walker | May 2, 1939 |
| 2,317,334 | Shimek | Apr. 20, 1943 |
| 2,340,272 | McCarty | Jan. 25, 1944 |
| 2,405,182 | Bollman | Aug. 6, 1946 |
| 2,420,672 | Maillet | May 20, 1947 |
| 2,480,561 | Ewing | Aug. 30, 1949 |
| 2,495,722 | Hoffman | Jan. 31, 1950 |
| 2,517,031 | Rochester | Aug. 1, 1950 |
| 2,527,548 | Hastings | Oct. 31, 1950 |
| 2,569,411 | Ellis | Sept. 25, 1951 |
| 2,606,317 | Wallace | Aug. 5, 1952 |
| 2,639,422 | Harris | May 19, 1953 |
| 2,837,738 | Van Valkenburgh | June 3, 1958 |
| 3,001,186 | Baltzer | Sept. 17, 1961 |